Nov. 1, 1932.  V. T. WREN  1,885,399
FREIGHT LOADING AND UNLOADING DEVICE FOR VEHICLES
Filed July 6, 1931  4 Sheets-Sheet 4
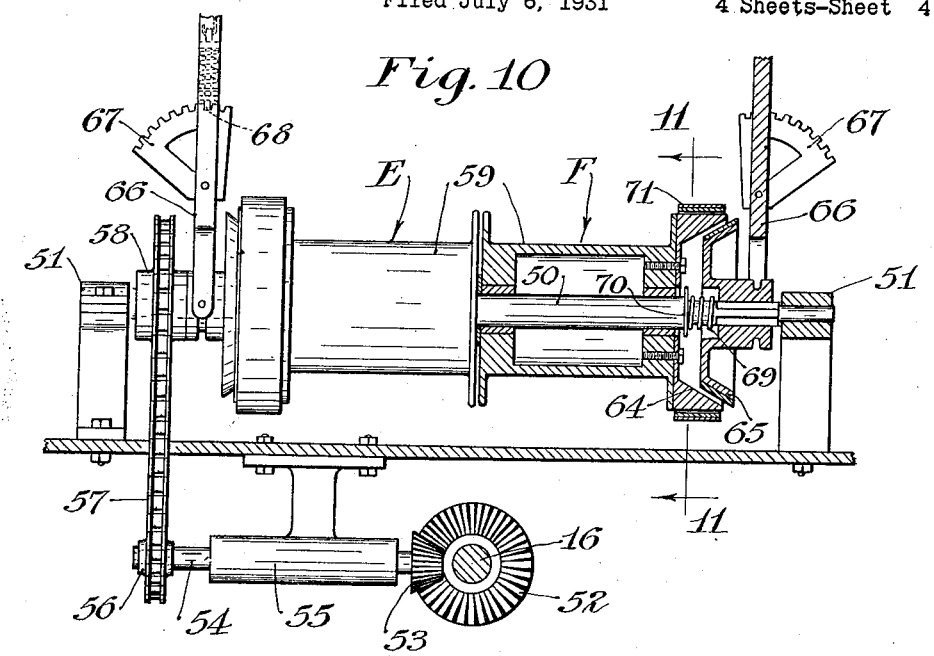
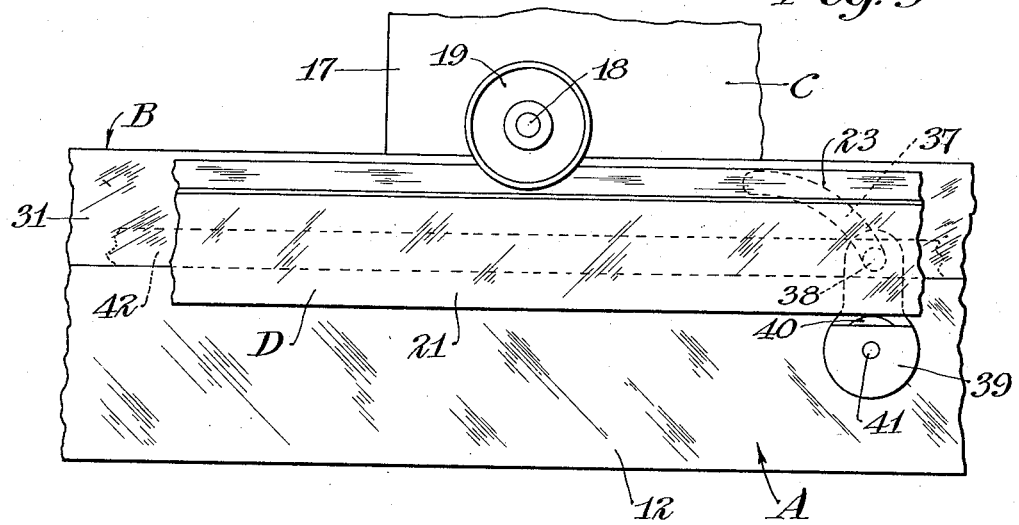
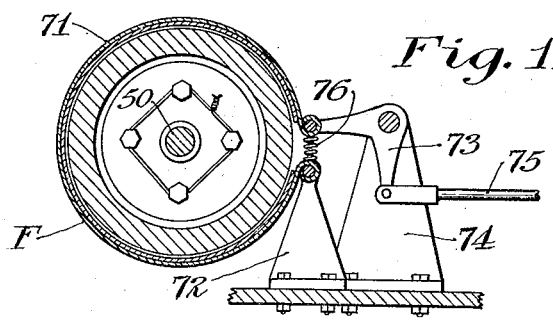
Inventor
Vincent T. Wren
By his Attorneys
Williamson & Williamson Patented Nov. 1, 1932

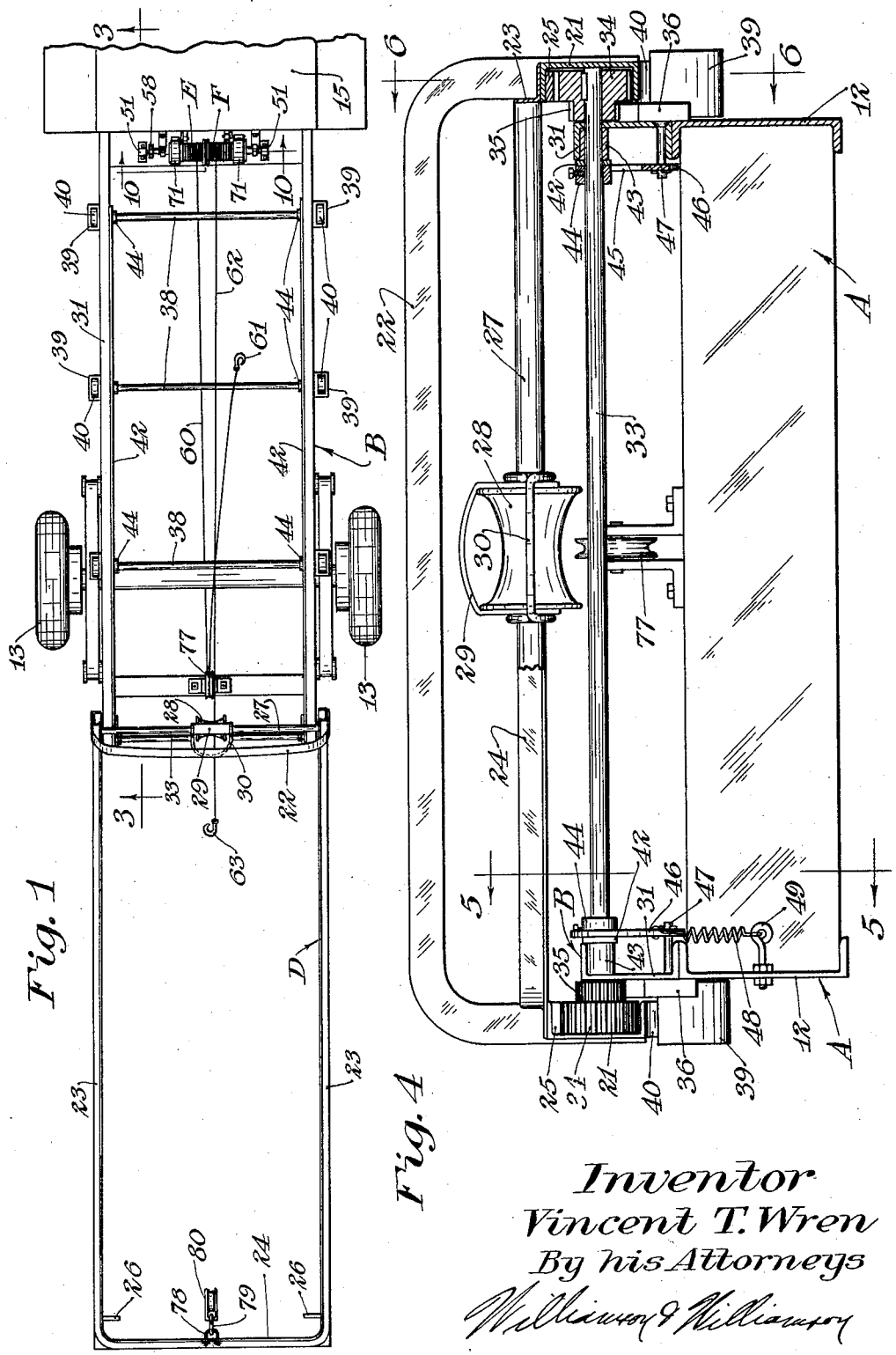

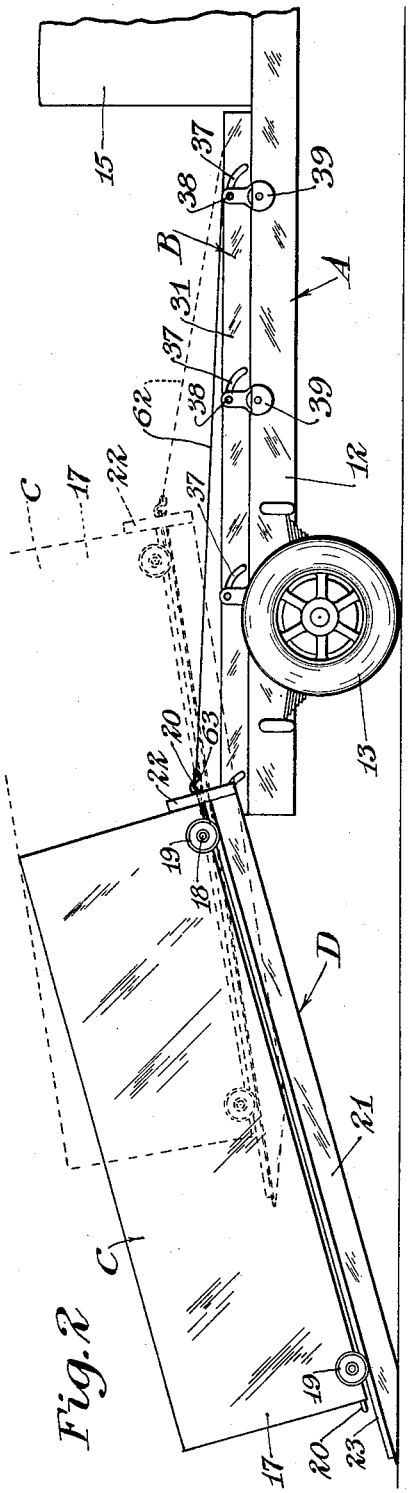
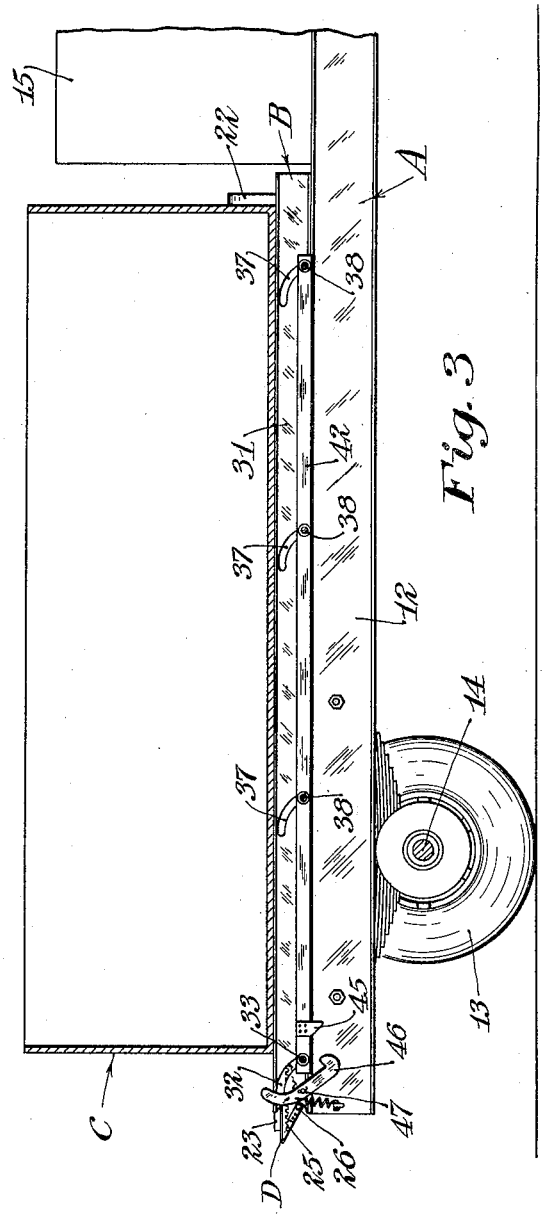

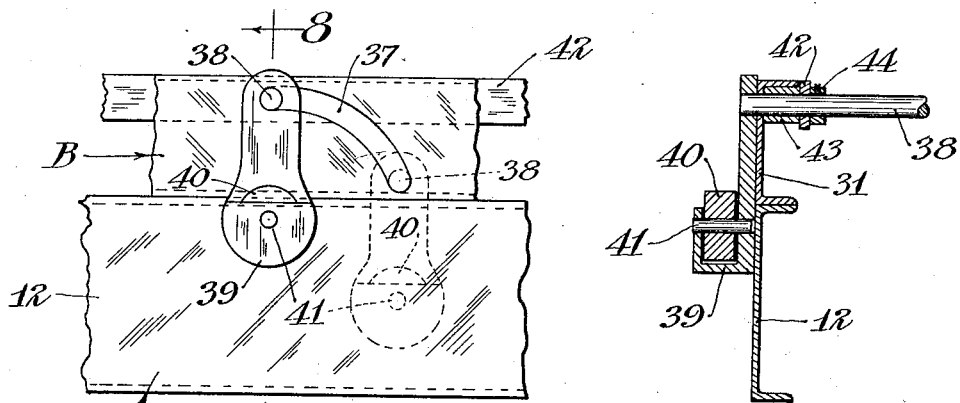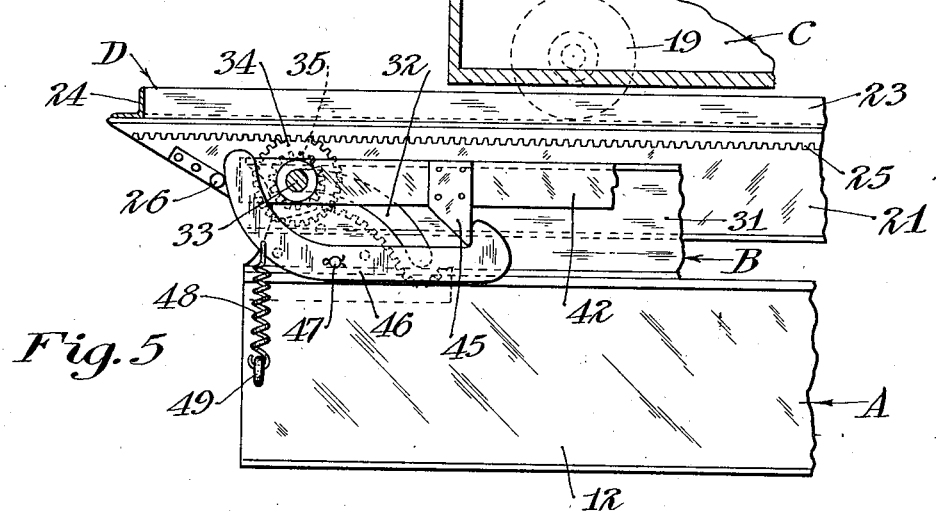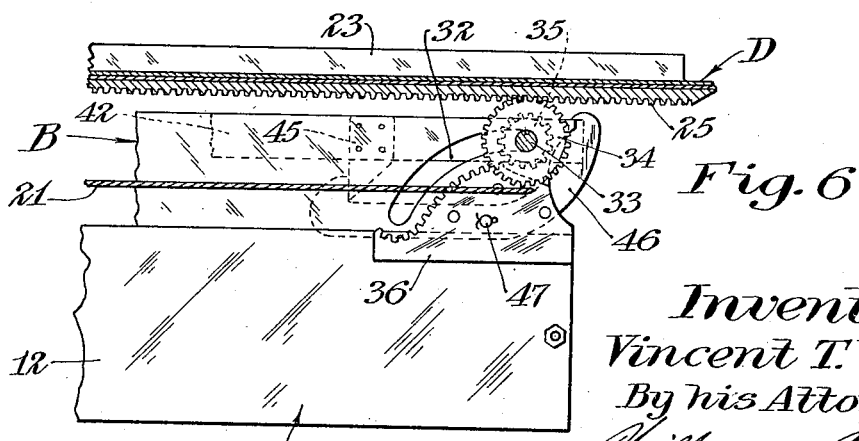

1,885,399

UNITED STATES PATENT OFFICE

VINCENT T. WREN, OF LAKEVILLE, MINNESOTA

FREIGHT LOADING AND UNLOADING DEVICE FOR VEHICLES

Application filed July 6, 1931. Serial No. 548,872.

This invention relates to freight loading and unloading devices for vehicles.

It is the object of this invention, generally stated, to provide a novel and improved device for loading and unloading freight onto and from vehicles with a minimum of labor and time to minimize the cost of freight transportation.

To this end, generally stated, the invention consists in the novel parts and novel combinations of parts hereinafter defined in the claims and described in the following specification, made in connection with the accompanying drawings, wherein like notations refer to the same or similar parts and, in which, Fig. 1 is a plan view showing a truck equipped with the loading and unloading device of the invention and illustrating the runway of the device in rearwardly extended position;

Fig. 2 is a view in side elevation of the device as shown in Fig. 1, the wheeled freight carrier of the invention being also shown and the carrier and runway being illustrated in full lines in one position and in dotted lines in another position;

Fig. 3 is a vertical section taken on the line 3—3 of Fig. 1 as indicated by the arrows, but illustrating the runway and carrier in loaded position on the vehicle;

Fig. 4 is a view chiefly in rear end elevation of the device when the parts are in the position shown in Fig. 3, some of the parts being broken away and shown in section;

Fig. 5 is a vertical section taken through the rear portion of the device on the line 5—5 of Fig. 4, as indicated by the arrows;

Fig. 6 is a vertical section taken through the rear portion of the device on the line 6—6 of Fig. 4, as indicated by the arrows;

Fig. 7 is a view in side elevation of a portion of the device, certain of the parts being shown in one position in full lines and in another position in dotted lines;

Fig. 8 is a vertical section taken on the line 8—8 of Fig. 7, as indicated by the arrows;

Fig. 9 is a view in side elevation showing portions of the device with the parts in the position they will assume when the carrier and runway are completely loaded on the vehicle;

Fig. 10 is a vertical section taken on the line 10—10 of Fig. 1, as indicated by the arrows; and Fig. 11 is a vertical section taken on the line 11—11 of Fig. 10.

Referring to the drawings, a truck chassis A is illustrated including frame 12, rear wheels 13, rear axle 14 connected to the frame 12 by springs, cab 15 and propeller shaft 16. In accordance with the invention, there may be provided a superframe structure B which rests on the frame 12 of the truck, one or more wheeled freight carriers C adapted to hold freight to be transported and a runway D, together with two power winches E and F.

The wheeled freight carrier C includes a body 17 of suitable shape and size for the particular freight to be handled and this body may be merely a rectangular box body, as illustrated. The body 17 carries axles 18 upon which suitable front and rear wheels 19 are mounted and the gauge of these wheels is slightly greater than the spacing between the sides of frame 12. The carrier C has preferably adjacent the lower edge of each end a central and projecting eye 20 adapted to receive a hook.

The runway D includes a pair of spaced parallel side bars 21 preferably constructed of channel iron and interconnected at their forward ends by a bar 22 of inverted U-shape and projecting upwardly from the side bars 21 to form a stop. Secured to the top sides of the upper horizontal flanges of the side bars 21 are angle irons 23 having inner and upwardly projectitng vertical flanges and forming rails upon which the wheels 19 of the carrier C are adapted to ride. An angle iron 24 is secured to the rear ends of the side bars 21 and interconnects the side bars and joins the angle irons 23, the angle iron 24 having curved ends for this purpose and also for the purpose of alining the wheels 19 of the carrier C properly with the rails formed by the angle irons 23. The lower rear ends of the bars 21 are preferably acutely beveled, as best shown in Figs. 2 and 5. Secured to the underside of the upper horizontal flanges of the side bars 21 are racks 25, while carried by the vertical flanges of the side bars 21 adjacent their rear ends are inwardly projecting pins 26. A strong shaft 27 is secured to the forward ends of the angle irons 23, projects between the same and has journaled thereon a concave roller 28, the said roller being centrally disposed between the two angle irons 23. An upwardly extending keeper 29 secured to the shaft 27 projects over the roller 28, while a rearwardly extending keeper 30 also secured to the shaft 27 extends rearwardly across the roller 28 and forms an eye for attachment of a hook.

The superframe structure B includes a pair of upwardly projecting bars 31 preferably of channel iron construction and secured to the sides of the frame 12 above the same. Journaled within the rear ends of the bars 31 within forwardly and downwardly extending arcuate slots 32 is a cross shaft 33 carrying pinions 34 at its two ends which mesh with the respective racks 25 of the runway and fit within the channels of the side bars 21. Secured to or formed integral with the pinions 34 and inwardly disposed therefrom on shaft 33 are a pair of smaller pinions 35. For cooperation with these pinions 35 there are secured to the outer sides of the bars 31 adjacent their rear ends a pair of blocks 36 shaped as best shown in Fig. 6, and having rack teeth formed on their upper edges forwardly of the pinions 35 when the shaft 33 is disposed in the upper rearmost position in the slots 32. The teeth on the blocks 36 follow the general curvature of the slots 32 and, accordingly, incline forwardly and downwardly and then somewhat slightly upwardly to form concavities in the lower forward upper edges of the blocks 36. When the shaft 33 is in its upper and rearmost position in the slots 32, the pinion 35 will not engage the teeth on the blocks 36, but when the shaft 33 is forwardly swung slightly from its upper rearmost position, the pinions 35 will mesh with the teeth on the blocks 36. Forwardly spaced from the slots 32 and spaced from each other longitudinally of the bars 21, other slots 37 are cut in the bars 21 and these slots are arcuately cut and project forwardly and downwardly so that they are of similar shape to the two rear slots 32. Mounted in oppositely disposed slots 37 in the two bars 31 are cross shafts 38 which carry at their ends, outwardly from the bars 31, roller blocks 39. These roller blocks 39 have outwardly disposed pockets within which rollers 40 mounted on pins 41 carried by the blocks 39 are disposed. The rollers 40 project upwardly above the pockets of the blocks 39. The various shafts 33 and 38 project through and are journaled in longitudinally extending bars 42 which are slightly inwardly disposed from the inner edges of the upper horizontal flanges of the bars 31 and spaced from the vertical webs of the bars 31 by means of spacing collars 43. The bars 42 are held from inward sliding movement on the shafts 33 and 38 by collars 44. The two bars 42 adjacent their rear ends carry downwardly projecting teeth 45 which are normally adapted to be engaged by dogs 46 pivoted on pins 47 projecting inwardly from the bars 31 adjacent their rear ends. These dogs 46 have rearwardly and upwardly inclined rear ends adapted to be engaged at times by the pins 26 carried by the runway D. The dogs 46 are normally held with their rear ends in downwardly swung position by means of springs 48 secured to the dogs 46 and to eyes 49 mounted in the sides of the frame 12 adjacent the rear ends thereof. The teeth 45 incline downwardly and forwardly from their rear edges toward their front edges, while the forward ends of the dogs 46 are rounded so that as the two bars 42 move rearwardly relative to the dogs 46, the forward ends of the dogs will be swung downwardly until the springs 48 force the teeth of the dogs into engagement with the teeth 45.

The two power winches E and F can be variably constructed and can be driven in various manners from the engine of the truck A. In the drawings Figs. 10 and 11, constructions that could be used are illustrated. A horizontal cross shaft 50 journaled in suitable bearings 51 is mounted behind the cab 15 above the propeller shaft 16. This shaft 50 is driven from the propeller shaft 16 by a beveled gear 52 mounted on the propeller shaft, a beveled gear 53 mounted on a short cross shaft 54 journaled in a suitable bearing 55 secured to a portion of the frame work of the truck A, a sprocket 56 secured to the shaft 54, a sprocket chain 57 and a sprocket 58 mounted on the shaft 50, the said sprocket chain 57 running over the two sprockets 56 and 58. Journaled on the shaft 50 are two winding drums 59, one for each winch E and F. A cable 60 carrying a hook 61 is secured to and adapted to be wound on drum 59 of winch E while a cable 62 having a hook 63 secured thereto is applied to and adapted to be wound on the drum 59 of winch F. The two drums 59 carry at their outer ends conical friction clutch members 64 adapted to be respectively engaged by friction clutch members 65 splined on the shaft 50 and adapted to be slidably shifted thereon by shipper levers 66 engaging grooves in the hubs of the clutch member 65 and suitably pivoted on gear segments 67. Each lever 66 carries a spring pressed pin 68 adapted to be engaged with the respective teeth of one of the segments 67 to hold a clutch member 65 in a desired shifted position. Springs 69 will act between collars 70 on the shaft 50 and the recessed inner ends of the clutch members 65 to normally press the clutch members 65 out of engagement with the clutch members 64. The outer surfaces of the clutch members 64 form brake drums about which brake bands 71 extend and these brake bands may be pivoted at one end on suitable brackets 72 secured to the truck chassis and they may be pivoted at their other ends in the arms of bell crank levers 73 pivotally mounted in suitable brackets 74 also supported from the chassis frame of the truck. Actuating rods 75 run from the bell crank levers 73 forwardly into the cab 15 of the truck. The two ends of each brake band 71 are normally held apart to prevent the band from engaging the drum formed by a half clutch member 64 by a spring 76. It will be seen that either or both of the drums 59 may be rotated by the shaft 50 by swinging the appropriate lever or levers 66 and that either or both of the drums 59 may be held from rotation by operation of the proper actuating rod or rods 75. The cable 60 runs rearwardly from the drum 59 to which it is attached below and over a sheave 77 mounted on a cross bar of the frame 12 adjacent its rear end. The cable 62 runs rearwardly from the drum 59 to which it is attached over the concave roller 28 below keeper 29.

*Operation*

To load the freight carrier C onto the truck, the runway D will be extended rearwardly from frame 12 to the position shown in Figs. 1 and 2, so that the rear end of the runway rests on the ground or on a loading platform. The freight carrier C which may or may not be loaded with whatever merchandise it is desired to transport, may then be run to a position directly behind the runway D so that the front wheels 19 of the carrier are approximately in alinement with the rails formed by the angle irons 23. The cable 62 will then be unwound from the drum 59 to which it is attached until the hook 63 may be engaged with the eye 20 at the forwardly facing end of the carrier C. The shipping lever 66 of the winch F may then be operated to cause the two clutch members 65 and 64 of winch F to engage thereby causing the drum 59 of this winch to rotate to wind the cable 62 onto this drum. The curved ends of the angle iron 24 will properly guide the wheels 19 of the carrier onto the runway D and the carrier will be drawn up the runway until it assumes the position shown in full lines Fig. 2 with the forward end of the carrier engaging the bar 22. This bar will, of course, stop the relative movement between the carrier C and the runway D. As the winch F continues to operate, both the runway D and the carrier C will be drawn upwardly and forwardly over the pinions 34 of shaft 33. The racks 25 of the runway will, of course, mesh with the pinions 34, whereupon when the balance of the load of the runway D and carrier C is forward of the shaft 33, so that the carrier and runway are approximately in the dotted line position shown in Fig. 2, the forward portions of the runway and carrier will tip downwardly until the lower flanges of the bars 21 ride upon certain of the rollers 40 carried in the roller blocks 39. The continued operation of the winch F will draw the runway D and carrier C forwardly over the superframe structure B until the pins 26 on the runway strike the rear ends of the dogs 46 to tip the forward ends of these dogs downwardly out of engagement with the teeth 45. The pins 26 shortly after engaging the rear ends of the dog 46 will strike the rear ends of the bars 42 thereby causing these bars 42 to move forwardly to throw the pinions 35 into engagement with the teeth of the blocks 36. The clutch of the winch F may now be disengaged whereupon the bars 42 together with the rollers 40, blocks 39, shafts 33 and 38 will be carried downwardly and forwardly to thereby lower the runway D and carrier C until the bottom of the carrier rests directly on the bars 31. The freight carrier and runway are now completely loaded on the truck and the truck may be driven to the desired point where the carrier C is to be unloaded.

When it is desired to unload the carrier C from the truck, the hook 61 attached to the cable 60 will be engaged with the keeper 30 as an eye after the hook 61 and cable have been first drawn forwardly below the runway D. The clutch of the winch E will now be engaged by operation of the shipping lever 66 of this winch to cause the winch E to be set in operation to wind the cable 60 onto the drum 59 of winch E. As the winch E operates, the pinions 35 on shaft 33 will first climb the teeth of the blocks 36 to raise the bars 42, shafts 33 and 38, blocks 39 and rollers 40. The carrier C will thus be lifted from its position of rest on the bars 31 and the carrier and runway D will be moved upwardly and somewhat rearwardly until the shafts 33 and 38 are carried to their upper and innermost positions in the slots 32 and 37 whereupon the pinions 35 will no longer mesh with the teeth on the blocks 36. Continued operation of the winch E will slide the runway D and carrier C rearwardly on the rollers 40 until the combined weight of the carrier and runway rearwardly of the shaft 33 overbalances weight of the runway and carrier forwardly of the said shaft to cause the runway and carrier to assume the dotted line position shown in Fig. 2. Shortly before the carrier and runway reach the dotted line position, the actuating rod 75 of the brake of winch F will be operated to hold the drum of winch F from rotation and prevent the cable 62 from being paid out. This will prevent the runway and carrier from crashing to the ground. The winch E may now be set out of operation whereupon the carrier and runway may be allowed to slowly drop to the ground to assume the full line position shown in Fig. 2 by permitting the drum of winch F to rotate slightly by easing off the pressure on the shoe 71 of the brake of winch F. The carrier C may now be allowed to slowly run down the runway D until the rear wheels 19 of the carrier rest on the ground. If desired, the carrier C may be pushed completely off the runway, or if desired the truck may be driven forwardly to move the runway D forwardly relative to the carrier. The hook 63 will now be detached from the eye 20 whereupon the carrier C will be completely unloaded from the truck. The runway D may now be again drawn onto the truck in the same manner as previously.

It will be seen that the carrier C may be quickly and easily loaded and unloaded onto and from the truck. The device of the invention is particularly adapted for use by railroad companies in transporting freight to and from manufacturing plants and freight yards. It is contemplated that a large number of the carriers C will be provided for use with each truck. The trucks will deliver the carriers to different shippers of goods in the morning, whereupon the goods to be shipped may be placed in the carriers during the daytime and the carriers may then be picked up by the truck and transported to the railroad yards towards evening. The truck will be released for use during the daytime and it becomes unnecessary to individually load and unload the separate articles of freight onto and from the truck. A great saving in time and labor will thus be made. It is contemplated that the carriers C may be loaded directly onto railroad flat cars and delivered without removal of the goods therefrom to their destination by other trucks.

When the carriers are completely loaded on the trucks, they will be stably supported so that the carriers cannot jar off of the trucks.

It will, of course, be understood that a great many changes may be made in the form, details, arrangement and proportions of the various parts without departing from the scope of the present invention.

In Fig. 1, there is shown a bracket 78 secured to the rear angle iron 24 of the runway. Attached to this bracket 78 by a hook 79 is a pulley block 80. When desired, the pulley block 80 may be used to permit the cable 62 to be run therethrough. In unloading the freight carrier C, it is not necessary that the lower rear end of the runway D be carried downwardly below the level of the frame 12 of the truck. It is possible for the truck to be backed up to a platform, whereupon during the unloading operation the rear end of the runway D may be carried rearwardly to rest on the top of the platform even though this platform be disposed at no lower level than the frame 12 of the truck. By running the cable 62 over the pulley block 80 and attaching the hook 63 to the forward eye 20, the winch F may be set in operation to draw the carrier C rearwardly off the runway D after the runway has been completely extended from the superframe structure B. For ordinary usage, the pulley block 80 will not be used and the hook 79 may, accordingly, be detached from the bracket 78 to permit storage of the pulley block in the truck body.

What is claimed is:—

1. A freight loading and unloading device for vehicles having in combination, a vehicle chassis, a runway, a wheeled freight carrier, said runway being adapted to be extended from the rear of said chassis to form an approach thereto upon which said carrier may ride, means on said vehicle for drawing said carrier on said runway when rearwardly disposed and for drawing said carrier and said runway both forwardly onto said chassis, means mounted on said chassis for drawing said runway and said carrier rearwardly relative to said chassis to unload said carrier from both said chassis and runway, and means for lowering said runway and carrier relative to said chassis to permit said carrier to rest on said chassis as said runway and carrier are drawn toward the forward end of said chassis.

2. A freight loading and unloading device for vehicles having in combination, a vehicle chassis, a frame mounted on said chassis and movable downwardly and forwardly and upwardly and rearwardly within confined limits relative to said chassis, means normally retaining said frame in upwardly and rearwardly disposed position relative to said chassis, a shaft mounted in said frame, pinions carried by said shaft adjacent its ends, rollers carried by said frame at the sides of said chassis, a runway, racks carried by said runway engaging with said pinions, said runway being adapted to be extended rearwardly and downwardly from said chassis and adapted to be slid forwardly and over said chassis riding on said pinions and said rollers, a wheeled freight carrier adapted to be drawn onto said runway, a stop on said runway limiting the forward movement of said carrier relative to the runway, a loading winch mounted on said chassis and including a cable adapted to be connected to said carrier whereby when said cable is connected and said loading winch is set in operation, said carrier may be drawn onto said runway, when rearwardly extended, to strike said stop and thereby cause both the runway and carrier to be drawn onto said chassis, means carried by said runway for releasing said holding means as said carrier is drawn onto said chassis to thereby lower said runway and carrier to permit the carrier to rest on said chassis and an unloading winch on said chassis including a cable adapted to be attached to the forward end of said runway to slide said runway and carrier rearwardly from said chassis as said unloading winch is set in operation.

3. A freight loading and unloading device for vehicles including in combination, a vehicle chassis, a pair of bars secured to the sides thereof in upstanding relation, a frame mounted in said bars and movable within confined limits downwardly and forwardly and upwardly and rearwardly relative to said bars, rollers carried by said frame outwardly from said bars, a cross shaft mounted in said frame, runway engaging members carried by said shaft adjacent the ends thereof, a runway riding on said runway engaging members and adapted to be extended rearwardly and downwardly from said chassis to rest at its rear end on the ground and adapted to be drawn forwardly over said runway engaging members to slide on said rollers, a wheeled freight carrier adapted to be drawn onto said runway when rearwardly extended, a stop carried by said runway and adapted to be engaged by said carrier to limit the forward movement of said carrier on said runway, means normally holding said frame in upwardly and rearwardly extended position, means carried adjacent the rear end of said runway for engaging said last mentioned means to release the same and permit said frame to be swung downwardly and forwardly and a loading winch including a cable adapted to be attached to said carrier whereby when said cable is attached, said loading winch may be set in operation to draw said carrier onto said runway, when rearwardly extended, until said carrier strikes said stop and to then draw said runway and carrier onto said chassis until said holding means is released to permit said frame to be lowered until said carrier rests on said bars.

4. The structure defined in claim 3, and an unloading winch mounted on said chassis and including a cable extensible forwardly from the rear end of said chassis and adapted to be engaged with the forward end of said runway, said unloading winch adapted to be set in operation when the cable thereof is engaged to first raise said frame, runway and carrier upwardly and rearwardly relative to said chassis and then to slide said runway and carrier rearwardly from said chassis over said rollers and runway engaging members.

5. The structure defined in claim 3, and a brake controlling said winch.

6. A freight loading and unloading device for vehicles having in combination, a vehicle chassis, a pair of bars extending upwardly from said chassis and mounted on the sides thereof, a frame movable within defined limits forwardly and downwardly and upwardly and rearwardly in said bars, a shaft journaled in the rear end of said frame, runway engaging members carried adjacent the ends of said shaft, runway engaging rollers carried by said frame outwardly from said bars, pinions carried by said shaft adjacent the ends thereof, forwardly and downwardly inclined gears normally not engaged with said pinions when said frame is in its upper and rearwardly disposed position but adapted to engage with said pinions as said frame is moved forwardly from said upwardly and rearwardly disposed position, teeth carried by said frame, dogs normally engaging said teeth to retain said frame in upwardly and rearwardly disposed position, a runway mounted on said runway engaging members and extensible rearwardly and downwardly from said chassis to rest at its rear end on the ground and adapted to be slid forwardly over said runway engaging members and said rollers over said chassis frame, dog engaging members carried at the rear end of said runway to engage said dogs and release the same from said teeth to permit said frame to be swung forwardly and downwardly as said runway is carried forwardly over said chassis, a wheeled freight carrier adapted to be drawn onto said runway when rearwardly extended, a stop limiting the forward movement of said freight carrier relative to said runway, and a winch mounted on said chassis and including a cable extensible rearwardly from the forward end of said chassis to engage said carrier, whereby when said cable is engaged and said winch is set in operation, said carrier will be drawn onto said runway, when the runway is rearwardly extended, to strike said stop and said runway and carrier may be drawn forwardly over said chassis to a point where said dog engaging members release said dogs from said teeth to thereby permit said frame, runway and carrier to be lowered on said chassis until said carrier rests on said bars.

7. The structure defined in claim 6, and an unloading winch mounted on said chassis and including a cable extensible forwardly from the rear end of said chassis and attachable to the forward end of said runway whereupon on operation of said unloading winch when the cable thereof is attached, said runway will be drawn rearwardly to cause said pinions to ride upwardly and rearwardly on said gears to first raise said frame, runway and carrier and to then permit said runway and carrier to be slid rearwardly onto said runway engaging members and rollers to a position where said runway extends rearwardly beyond said chassis and rests at its lower end on the ground.

8. A freight loading and unloading device for vehicles having in combination, a vehicle chassis, a frame mounted on said chassis and movable downwardly and forwardly and upwardly and rearwardly within confined limits relative to said chassis, means normally holding said frame in upward and rearward position, a runway, a wheeled freight carrier, said runway being adapted to be extended from the rear of said chassis to form an approach thereto upon which said carrier may ride, means on said vehicle for drawing said carrier onto said runway when rearwardly disposed therefrom and for drawing said carrier and runway both onto said frame and means operable as said runway and carrier are drawn onto said frame to release said first mentioned means and permit forwardly swinging movement of said frame, carrier and runway to cause said runway and carrier to rest directly on said chassis.

9. A freight loading and unloading device for vehicles having in combination, a vehicle chassis, a frame mounted on said chassis for limited downward and forward and upward and rearward movement relative to the chassis, means normally retaining said frame in upward and rearward position, a runway, a wheeled freight carrier, said runway being adapted to be extended from the rear of said chassis to form an approach thereto upon which said carrier may ride, means on said vehicle for drawing said carrier onto said runway when said carrier is rearwardly disposed and for drawing said carrier and runway onto said frame, members mounted on said carrier for engaging said first mentioned means to release the same when said runway and carrier have been completely drawn onto said frame to permit said frame to move forwardly and downwardly and allow said runway and carrier to rest directly on said chassis and means mounted on said chassis for moving said frame upwardly and rearwardly to raise said runway and carrier from said chassis, said last mentioned means also acting to slide said runway and carrier rearwardly relative to said frame.

In testimony whereof I affix my signature.

VINCENT T. WREN.